(12) United States Patent
Stephens et al.

(10) Patent No.: US 6,322,850 B1
(45) Date of Patent: Nov. 27, 2001

(54) MOLD RELEASE REACTION PRODUCT AND METHOD OF COATING OF A MOLD CORE

(75) Inventors: William D. Stephens, Clearwater; Patricia R. Bertolucci, Tampa, both of FL (US)

(73) Assignee: TSE Industries, Inc., Clearwater, FL (US)

( * ) Notice: Subject to any disclaimer, the term of this patent is extended or adjusted under 35 U.S.C. 154(b) by 0 days.

(21) Appl. No.: 09/556,283

(22) Filed: Apr. 24, 2000

(51) Int. Cl.$^7$ ........................................................ B05D 5/08
(52) U.S. Cl. ...................... 427/133; 427/387; 427/397.7
(58) Field of Search ........................ 427/133, 134, 427/135, 397.7, 387, 299

(56) References Cited

U.S. PATENT DOCUMENTS

| | | | | |
|---|---|---|---|---|
| 3,684,756 | * | 8/1972 | Brooks | 260/29.1 SI |
| 3,883,628 | * | 5/1975 | Martin | 264/54 |
| 3,905,823 | * | 9/1975 | Piskoti | 106/38.22 |
| 3,959,242 | * | 5/1976 | Watts et al. | 427/133 |
| 4,110,095 | * | 8/1978 | Stengle, Jr. | 65/26 |
| 4,267,297 | * | 5/1981 | Hanada et al. | 528/18 |
| 4,789,510 | * | 12/1988 | Toda | 264/60 |
| 4,822,646 | * | 4/1989 | Clark et al. | 427/387 |
| 5,425,848 | * | 6/1995 | Haisma et al. | 427/264 |
| 5,601,641 | * | 2/1997 | Stephens | 427/255.6 |

* cited by examiner

Primary Examiner—Shrive P. Beck
Assistant Examiner—Kirsten A. Crockford
(74) Attorney, Agent, or Firm—Larson & Larson, P.A.; James E. Larson

(57) ABSTRACT

The reaction product is derived from a composition containing one of seven silanes; dimethyldiethoxysilane, methyldiethoxysilane, dimethyldimethoxysilane, diphenyldimethoxysilane, trimethylmethoxysilane, trimethylethoxysilane, or aminopropyltriethoxysilane, a multi-functional polydimethyl siloxane emulsified polymer, a compatible surfactant, ethanol and a majority component of water. In the method, the reaction product is applied to a heated surface of a mold core to create a semi-permanent coating to facilitate multiple releases of molded parts. If not heated, the mold core must be dried to remove water.

9 Claims, No Drawings

MOLD RELEASE REACTION PRODUCT AND METHOD OF COATING OF A MOLD CORE

BACKGROUND OF THE INVENTION

1. Field of the Invention

This invention relates to the use of organo-silanes as mold release agents. More particularly, it refers to aqueous compositions and methods of using select organo-silanes for coating mold surfaces and thereafter obtaining clean mold surfaces after repeated ejections of plastic parts from the mold.

2. Description of Prior Art

In the process of preparing molded products such as urethanes, natural rubber, silicones, neoprene, and other synthetic elastomers, it is necessary to coat the core surfaces of a mold to prevent the molded product from sticking to the mold. Coatings used to prevent such molded products from sticking to molds are called mold release agents. Most prior art mold release agents were organic solvent based compositions. This caused undesirable vapors dangerous to the environment and particularly to the mold operators.

An advance in non-solvent based mold release agents was disclosed in U.S. Pat. No. 5,219,925. Methyltriethoxysilane, methyltrimethoxysilane, vinyltriethoxysilane and vinyltrimethoxysilane were each disclosed as an active component in an aqueous mold release composition. These compositions have been readily accepted in the marketplace and one or more is used in mold release compositions commercially. One is identified as CRYSTAL® 1053, containing methyltriethoxysilane. Although these compositions are ideal for use in repeated mold releases of plastic products and elastomers, the molds themselves have sometimes become discolored. Another composition that will have satisfactory mold release properties and prevent mold discoloration is needed.

SUMMARY OF THE INVENTION

The present invention is the discovery of nine unique silanes promoting multiple releases of plastic products from molds coated with a composition containing the unique silanes, but at the same time causing the mold surface to retain its luster. The unique silanes are:

ethyltriethoxysilane,
dimethyldiethoxysilane,
methyldiethoxysilane,
trimethylmethoxysilane,
trimethylethoxysilane,
dimethyldimethoxysilane,
diphenyldimethoxysilane,
aminopropyltriemethoxysilane, or
aminopropyltriethoxysilane.

The composition contains one of the above unique silanes in an aqueous reaction mixture with a multi-functional polydimethyl siloxane emulsified polymer, a surfactant, ethanol and water.

DETAILED DESCRIPTION OF THE INVENTION

The composition of this invention is a reaction mixture of a multi-functional polydimethyl siloxane emulsified polymer, and a unique silane from the group consisting of:

ethyltriethoxysilane,
dimethyldiethoxysilane,
methyldiethoxysilane,
trimethyimethoxysilane,
trimethylethoxysilane,
dimethyldimethoxysilane,
diphenyldimethoxysilane, aminopropyltrithoxysilane,
aminopropyltriethoxysilane. In addition the composition contains a compatible surfactant, ethanol and the major component of water.

The composition contains the ingredients as a percent by weight in the following ranges:

0.5 to 12% of a silane selected from the group of unique silanes set forth above, 1 to 8% of a multi-functional polydimethylsiloxane emulsified polymer, 0.1 to 2.5% of a first compatible surfactant such as substituted nonyl or octyl phenol derivative surfactant, 0.1 to 2.5% of a second compatible surfactant such as synthetic ethoxylated amine surfactant 0.1 to 30% ethanol and the remainder water.

Other compatible surfactants such as ethoxylated nonionic fluorosurfactant (ZONYL® FSO, (ZONYL® FS-300) obtained from E.I. duPont de Nemours and Company, may be substituted for the nonyl phenol, octyl phenol or ethoxylated amine.

Three to five grams of the composition is applied to each square foot of a compression or injection molding core surface and then heated to about 320 degrees F. or dried to remove the water to form an interpenetrating network.

The preferred composition is prepared by mixing the following ingredients (% by weight) in water:

3% ethyltriethoxysilane,
1.8% decamethylcyclopentasiloxane,
1.6% octamethylcyclotetrasiloxane,
0.6% dodecamethylcyclohexasiloxane,
1.5% surfactants which are a substituted nonyl or octyl phenol derivative and synthetic ethoxylated amines,
3.0% ethanol, and
88.5% water.

The ethyltriethoxysilane reacts with the water to produce additional ethanol. The mixture is sprayed on a clean mold core surface and heated to 320 degrees F. or dried with air to vaporize the water and coat the mold core.

The ethyltriethoxysilane can be substituted with:
dimethyldiethoxysilane,
methyldiethoxysilane, trimethylmethoxysilane,
trimethylethoxysilane,
dimethylditnethoxysilane,
diphenyldimethoxysilane,
aminopropyltrimethoxysilane, or aminopropyltriethoxysilane.

to achieve substantially the same results in the mixture and on spraying the resulting mixture on a mold core.

The following examples exemplify a method of preparing the reaction product compositions of this invention and applying it to mold core surfaces.

EXAMPLE 1

1,324.5 grams of distilled water mixed with:
13.455 gram of ethanol,
40.65 grams of a multi-functional polydimethylsiloxane emulsified polymer 39.75 grams of a polydimethylsiloxane with terminal hydroxyl sites known as MASIL® SFR70, sold by BASF 8.655 grams of a silicone surfactant, identified as MASIL® SF19, sold by BASF 13.79 grams of a silicone polymer identified as E-155 sold by Wacker Silicones Corp.

49.35 grams of trimethylethoxysilane 6.735 grams of a fluorosurfactant identified as FC-430, sold by 3M, and 3.21 grams of 1.0 normal acetic acid.

Additional quantities of up to 4.5 grams of acetic acid is added to reduce the pH to a final number of 3.64 to form the reaction product. Both sides of a four inch mold were cleaned by plastic bead blasting. Thereafter, ethylenepropylenediene polymer with peroxide was cured at 370° F. for three minutes in the mold. After the cure, the product showed excellent release, i.e., the mold opened easily by hand. A second ethylenepropylenediene polymer was added to the mold and cured for three minutes at 370° F. with substantially the same result. The mold opened easily by hand.

Additional mold release compositions were prepared in the manner of Example 1 with the ingredients indicated by weight percent in the following Examples 2 through 5.

EXAMPLE 2

88.3% distilled water
0.897% ethanol
2.71% multi-functional polydimethylsiloxane polymer
2.65% MASIL® SFR-70
0.577% MASIL® SF-19
0.919% E-155
3.29% dimethyldirethoxysilane
0.449% FC-430
5 0.214% 1.0 normal acetic acid.

The pH of the final product was 3.94 with a solids content of 6.05%.

EXAMPLE 3

88.3% distilled water
0.897% ethanol
2.71% polydimethyl siloxane emulsified polymer
2.65% MASIL® SFR-70
0.577% MASIL® SF-19
0.919% E-155
3.29% ethyltriethoxysilane
0.449% FC-430
0.214% 1.0 normal acetic acid.

The final pH of the composition was 2.95 with a solids content of 6.52%.

EXAMPLE 4

88.3% distilled water
0.897% ethanol
2.71% polydimethylsiloxane emulsified polymer
2.65% MASIIL® SFR-70
0.577% MASIL® SF-19
0.919% E-155
3.29% diphenyldimethoxysilane
0.449% FC-430
5 0.214% 1.0 normal acetic acid.

The final composition had a pH of 3.75 with a solids content of 5.75%

EXAMPLE 5

88.3% distilled water
0.897% ethanol
2.71% polydimethylsioxane emulsified polymer
2.65% MASIL®SFR-70
0.577% MASIL® SF-19
0.919% E-155
3.29% trimethyhnethoxysilane
0.449% FC-430
0.214% 1.0 normal acetic acid.

The final composition had a pH of 3.83 with a solids content of 5.89%

EXAMPLE 6

A mold with an undercut and a difficult configuration was used for molding. In a mold such as this, the molding compound will easily stick and tear. The mold was first degreased and then cleaned by plastic bead blasting. Thereafter, the mold release composition of EXAMPLE 1 above, was sprayed on the mold in a thin coating and heated to molding temperature. Ethylenepropylenediene copolymer molding composition (EPDM) was separately applied to the mold and released from the mold after curing for three minutes at 370° F. EPDM molded product was repeatedly removed from the mold without tearing.

EXAMPLE 7

The procedure in EXAMPLE 6 was followed, except the reaction product of EXAMPLE 2 above, was substituted for the mold release product employed in EXAMPLE 6. Substantially the same results were obtained.

EXAMPLE 8

The same procedure was followed as in EXAMPLE 6, but the mold release product of EXAMPLE 3 was employed with the same results as shown in EXAMPLE 6.

EXAMPLE 9

The same procedure was followed as set forth in EXAMPLE 6 above, but the mold release agent employed was that in EXAMPLE 4 above. The same result was obtained as was obtained for the mold release compound of EXAMPLE 6.

EXAMPLE 10

The same procedure was employed as in EXAMPLE 6, but the mold release agent was the composition shown in EXAMPLE 5 above. Substantially the same release occurred as was obtained with the previous compositions.

We claim:

1. A method of forming a semi-permanent mold release surface on a mold core comprising cleaning the core surface, heating both sides of the core surfaces and spraying the mold core with a reaction product formed from an aqueous composition containing 0.5 to 12 percent by weight of a silane selected from the group consisting of ethyltriethoxysilane, dimethyldiethoxysilane, methyldiethoxysilane, dimethyldimethoxysilane, diphenyldimethoxysilane, trimethylmethoxysilane, triethylethoxysilane, aminopropyltrimethoxysilane and aminopropyltriethoxysilane;

a multi-functional polydimethyl siloxane emulsified polymer and a compatible surfactant together with about 0.1 to 30% by weight of ethanol and the remainder water.

2. The method of forming a semi-permanent mold release surface according to claim 1 wherein the silane is dimethyldiethoxysilane.

3. The method of forming a semi-permanent mold release surface according to claim 1 wherein the silane is methyldiethoxysilane.

4. The method of forming a semi-permanent mold release surface according to claim 1 wherein the silane is dimethyldimethoxysilane.

5. The method of forming a semi-permanent mold release surface according to claim 1 wherein the silane is diphenyldimethoxysilane.

6. The method of forming a semi-permanent mold release surface according to claim 1 wherein the silane is trimethylnethoxysilane.

7. The method of forming a semi-permanent mold release surface according to claim 1 wherein the silane is trimethylethoxysilane.

8. The method of forming a semi-permanent mold release surface according to claim 1 wherein the silane is aminopropyltrimethoxysilane.

9. A method of forming a semi-permanent mold release surface on a mold core comprising cleaning the core surface, spraying the mold core with a reaction product formed from an aqueous composition containing 0.5 to 12 percent by weight of a silane selected from the group consisting of dimethyldiethoxysilane, methyldiethoxysilane, diimethyldimethoxysilane, diphenyldimethoxysilane, trimethylmethoxysilane, triethylethoxysilane, and aminopropyltrimethoxysilane;

a multi-functional polydimethylsiloxane emulsified polymer and a compatible surfactant together with about 0.1 to 30% by weight of ethanol and the remainder water, and removing water from the mold release surfaces with air or by heating.

* * * * *